Patented Aug. 21, 1951

2,565,358

UNITED STATES PATENT OFFICE 2,565,358

AQUEOUS PRINTING PASTE

George Trapp Douglas, Arthur Lowe, and Sydney Robinson, Manchester, England, assignors to Imperial Chemical Industries Limited, a corporation of Great Britain No Drawing. Application April 20, 1948, Serial No. 22,258. In Great Britain April 21, 1947

10 Claims. (Cl. 260—29.2)

This invention relates to a process for textile colouration and more particularly it relates to a process for the colouration of textiles by means of aqueous pigment pastes. The invention also relates to compositions useful for the colouration of textiles.

According to our invention we provide a process for the colouration of textile materials characterised in that there is applied to the textile material an aqueous paste comprising a pigment, one or more compounds of the formula

where R stands for an organic residue, preferably an aliphatic radical substituted or not, A is the group of atoms which forms an aliphatic or heterocyclic tertiary amine, X stands for the anion of an acid and $n$ is a whole number greater than 1, and one or more synthetic resins, for example, polyvinyl chloride, or synthetic resin components or other materials which themselves or in conjunction with the compound or compounds of the hereinbefore given formula bind or fix the pigment on to the textile material.

The process is excellently suited for effecting the colouration by printing on to textile fabrics.

Also, according to our invention we provide aqueous pastes useful for the colouration of textiles comprising a pigment and an aqueous solution and/or suspension of one or more compounds of the formula

where R, A, X and $n$ have the significance hereinbefore ascribed thereto, and one or more synthetic resins or synthetic resin components or other materials which themselves or in conjunction with the compound or compounds of the hereinbefore given formula bind or fix the pigment on to the textile material.

The compounds used for the invention may be regarded as derivatives of compounds of the formula $R(OH)_n$, wherein R and $n$ have the significance stated above. They may conveniently be made in accordance with the process described in copending application Serial No. 764,259, filed July 28, 1947, and now issued as Patent No. 2,518,266, or specifically, by treating the compound $R(OH)_n$ with phosgene and by treating the chloroformic ester so obtained with ammonia, whereby a polycarbamate of the formula $R(OCONH_2)_n$ is obtained, followed by treatment of the said polycarbamate with formaldehyde (or a polymer thereof) and a hydrogen halide or other halogenating agent, for example, phosgene, thionyl chloride or phosphorus pentachloride, or with a product of the interaction of formaldehyde and a hydrogen halide, namely a dihalogenodimethyl ether, and then reacting the halogenomethyl compounds so obtained with an aliphatic or heterocyclic tertiary amine.

As suitable compounds for use for the invention there may be mentioned tristearin-tris-(carbamatomethylpyridinium) - trichloride, triolein-tris-(carbamatomethylpyridinium)-trichloride, stearic - N:N - diethylamido - 11:β:β' - tri-(carbamatomethylpyridinium) trichloride, tristearin - tris - (carbamatomethyltrimethylammonium)-trichloride, tristearin-tris-(carbamatomethyltrimethylammonium ) triacetate, octadecylene - 1:12 - bis - (carbamatomethylpyridinium)-dichloride, ethylene-1:2-bis - (carbamatomethylpyridinium)-dichloride, terephthalyl-bis-(oxyethylenecarbamatomethylpyridinium) - dichloride and trimethylene-1:3-bis-(carbamatomethylpyridinium)-dichloride.

These compounds may be obtained from pure or substantially pure intermediates or they may be obtained from mixtures or fractions of mixtures such as may be obtained from naturally occurring materials, for example, naturally ocurring fatty oils or hardened derivatives thereof. Thus, many of the foregoing compounds may be conveniently obtained by means of the procedure set forth above from, as the case may be, hydrogenated castor oil, castor oil, 11-hydroxystearic-N:N-die-(β-hydroxyethyl)-amide wherein the hydroxystearic component is obtained from hydrogenated castor oil or octadecane-1:12-diol in the crude form obtainable by complete hydrogenation of castor oil. Other starting materials include ethylene glycol, trimethylene glycol, tetramethylene glycol, hexamethylene glycol, decamethylene glycol, glycerol, and the di-ester from ethylene glycol and terephthalic acid.

The compound or the mixture of compounds should be used in the aqueous pastes of the invention in a proportion corresponding to at least twice the weight of the pigment present, in order to obtain the outstanding results which are consequent upon the use of these particular compounds for binding pigments on to the textile materials.

It is a feature of the present invention that, in addition to the compounds as hereinbefore defined, the aqueous paste contains, as a binder for the pigment, one or more synthetic resins or synthetic resin components or other materials which themselves or in conjunction with the said compound or mixture of said compounds bind or fix the pigment on to the fabric. Preferably, these materials are insoluble in water or they are convertible on the textile by means of the heat treatment hereinafter described into materials which are insoluble in water. Examples of such additives are polyvinyl chloride, polyvinyl acetate, polystyrene, acrylic polymers of all kinds, polyester-amides, polyamides, modified polyamides, urea-formaldehyde condensates such as dimethylolurea and dimethylolurea dimethyl ether, melamine-formaldehyde condensates and ethers of these, cellulose derivatives such as ethyl or glycol cellulose, alkyd resins unmodified or modified with drying or non-drying oils, polythene, and natural or synthetic rubbers, conveniently in the form of latex. Softening agents or plasticisers for these materials, for example, dibutyl phthalate or tricresyl phosphate, may also be present. These additives may be present in a finely divided solid form that is, in the form of a suspension, and/or they may be wholly or partly dissolved in the aqueous paste. Preferably, there is used a suspension of polyvinyl chloride together with a plasticiser for the polyvinyl chloride.

Any pigment may be used including azo-pigments and lakes, phthalocyanine pigments, vat dyestuffs in their water-insoluble form, and inorganic pigments such as carbon black, iron oxides, chrome yellows, titanium dioxide and lithopone. Mixtures may be used if desired.

In addition to the other ingredients, the aqueous pastes may contain a water-soluble thickening agent, such as for example, gum tragacanth, water-soluble cellulose ethers polyvinyl alcohol or partially saponified polyvinyl acetate. Of these, gum tragacanth is preferred. The aqueous pastes may contain a mild alkali, for example, sodium acetate, sodium carbonate, chalk, morpholine or ammonia, including, if desired, a mixture of water-soluble substances which form a conventional mildly alkaline buffer. If desired, the aqueous paste may contain a dispersing agent, for example, a condensation product of a long chain alcohol with ethylene oxide, or a long chain quaternary salt. The proportions of the several ingredients in the aqueous pastes can be varied widely, and they are adjusted in any convenient manner so that the pastes have a consistency suitable for application to the fabric by the particular technique to be employed for this purpose.

The aqueous pastes to be used in the process of the invention may be obtained by adding one or more of the compounds as hereinbefore defined, if desired in the form of a solution in a suitable solvent, for example, water, ethanol, isopropanol, butanol, cyclohexanol or a mixture of these, to water which conveniently contains a water soluble thickening agent, for example gum tragacanth, and then mixing the product so obtained with the other ingredients.

Polyvinyl chloride plasticized with, for example, dibutyl phthalate, is an excellent binder to be used in conjunction with the compound or compounds as hereinbefore defined, in which case, the aqueous paste is a suspension of solid, finely divided plasticised polyvinyl chloride and a pigment, in an aqueous solution and/or suspension of one or more compounds as hereinbefore defined, usually containing also a mild alkali and a water soluble thickening agent.

The aqueous pastes of the invention may be printed on to textile fabrics such as for example cotton, viscose rayon, or cellulose acetate artificial silk, preferably by means of an engraved roller or by means of more than one engraved roller, but, other methods may be used, for example, employing relief rollers or blocks or screens or stencils. Alternatively, textile fabrics may be padded through the aqueous pastes at a suitable dilution, or the pastes may be spread on to the fabrics, in order to obtain overall colouration effects. Other methods may be used to obtain such effects, for example, back-filling or spraying.

Whatever the nature of the aqueous pastes and whatever technique is used for applying them to the textile material, it is desirable to subject the coloured textile material to a heat treatment, for example, by steaming in an "ager" or by baking, whereby the prints are fixed or developed. The heat treatment is usually from 100° C. to 150° C. Preferably, the heat treatment is of at least 105° C. The heat treatment causes the decomposition of the compounds of the hereinbefore given formula into water-insoluble materials which are surprisingly useful for binding pigments and any other finely divided water-insoluble materials which may be present in the compositions on to the textile materials. The decomposition of the compounds of the hereinbefore given formula also results in the liberation of free acid, and, as indicated above, a mild alkali is conveniently included in the aqueous pastes for the purpose of neutralising such acid.

Since the operation of the invention involves, inter alia, the conversion on textile materials of originally water-soluble quaternary salts into water-insoluble materials it is desirable that, apart from the quaternary salt forming components, the compounds of the hereinbefore given formula should contain no substituents which endow them with solubility in water or aqueous fluids. This objective is realised, in practice, when R in the formula is devoid of any substituent which itself confers solubility in water or in aqueous fluids.

The printed or coloured textile materials obtained according to the present invention are distinguished by their excellent fastness to rubbing and washing and by their exceptionally soft handle. Also, provided a suitable choice of pigment is made, they have a good resistance to light, to weathering, and to dry cleaning solvents. The handle of the printed or coloured materials obtained according to the present invention may be made even better by subjecting them to a stentering operation.

The process of the present invention is superior to the previously known processes for printing textile materials with pigments, since by the process of the present invention it is possible to produce prints of excellent fastness properties and soft handle by a method which is simple to operate with the equipment normally available to textile printers, and which does not require special facilities for handling organic solvents such as are required, for example, with the so-called water-in-oil emulsion process.

The invention is illustrated but not limited by the following examples in which the parts and percentages are by weight, unless otherwise stated:

*Example 1*

11 parts of a 73% solution in butanol of tristearin t r i s - (carbamatomethylpyridinium) trichloride and 4 parts of dibutyl phthalate are mixed with 25 parts of an 8% aqueous solution of gum tragacanth and 40 parts of water. 8 parts of polyvinyl chloride powder and 2 parts of finely-divided chalk are added. The resulting suspension is well mixed and added to 10 parts of a 20% aqueous paste of the pigment obtained by coupling diazotised 2:5-dichloroaniline with 2:3- hydroxynaphthoic-p-toluidide. The suspension is well mixed to form a smooth viscous paste.

The paste so obtained is printed on to cotton fabric by means of engraved rollers, and the prints are developed by drying at 105° C. The level prints so obtained are fast to rubbing and exceptionally fast to washing.

Instead of drying at 105° C., the prints may be fixed by baking at 150° C. for 2 or 3 minutes.

Example 2

11 parts of a 72% solution of tristearin-tri-(carbamatomethyltrimethylammonium) trichloride in iso-propanol and 4 parts of dibutyl phthalate are well mixed with 22 parts of an 8% aqueous solution of gum tragacanth and 38 parts of water. The resulting mixture is added to 15 parts of a 20% aqueous paste of the pigment obtained by coupling tetrazotised 3:3'-dichlorobenzidine with 1-phenyl-3-methyl-5-pyrazolone, and 2 parts of finely divided chalk. 8 parts of polyvinyl chloride powder are added and the whole is well mixed until a smooth viscous paste is obtained.

The paste so obtained is printed on to cotton fabric by means of an engraved roller, and the prints are developed by baking at 150° C. The so obtained prints have an excellent fastness to washing and rubbing and a very soft handle.

Example 3

12 parts of a 66% solution of tristearin-tri-(carbamatomethyltrimethylammonium) triacetate, 3 parts of water, 2 parts of chalk and 4 parts of dibutyl phthalate are well mixed and then added to a mixture of 30 parts of an 8% aqueous solution of gum tragacanth, 5 parts of water containing 0.486 part of potassium dihydrogen phosphate and 0.134 part of sodium hydroxide (buffer solution of pH 7-8), and 24 parts of a 33% aqueous dispersion of finely divided polyvinyl chloride. The whole is well mixed with 20 parts of an aqueous suspension of copper phthalocyanine containing 10% of pigment until a smooth viscous paste is obtained.

The so obtained paste is printed on to cotton fabric by means of an engraved roller, and the prints are developed by baking at 150° C. The so obtained prints have an excellent fastness to washing and rubbing and a soft handle.

Example 4

4 parts of a 25% aqueous solution of the condensation product of cetyl alcohol with 17 molecular proportions of ethylene oxide are well mixed with 24 parts of a 33% aqueous dispersion of finely divided polyvinyl chloride and added to a mixture of 30 parts of an 8% aqueous solution of gum tragacanth and 5 parts of water containing 0.486 part of potassium dihydrogen phosphate and 0.134 part of sodium hydroxide (buffer solution of pH 7-8). 11 parts of a 75% solution of trimethylene-1:3-bis-(carbamatomethylpyridinium)dichloride in isopropanol, 4 parts of dibutyl phthalate and 2 parts of chalk are well mixed and added to the above mixture. The resulting composition is milled with 20 parts of a 10% aqueous suspension of chlorinated copper phthalocyanine until a smooth viscous paste is formed.

The so obtained paste is printed on to cotton fabric by means of an engraved roller, and the prints are developed by baking at 150° C. The so obtained prints have excellent fastness to washing and rubbing and a soft handle.

Example 5

12 parts of a 67% cyclohexanol solution of tristearin - tri - (carbamatomethylpyridinium)-trichloride and 4 parts of dibutyl phthalate are intimately mixed with 2 parts of titanium dioxide and 2 parts of chalk. The resulting dispersion is well mixed with 24 parts of a 33% aqueous dispersion of finely divided polyvinyl chloride, 33 parts of an 8% aqueous solution of polyvinyl alcohol and 23 parts of water, and the whole is milled until a smooth viscous paste is obtained.

The so obtained paste is printed on to cotton fabric by means of an engraved roller, and the prints are developed by baking at 150° C. The so obtained prints have excellent fastness to washing and rubbing and a soft handle.

Example 6

24 parts of a 33% aqueous dispersion of finely divided polyvinyl chloride are well mixed with 30 parts of an 8% aqueous solution of gum tragacanth, 5 parts of water containing 0.486 part of potassium dihydrogen phosphate and 0.134 part of sodium hydroxide (buffer solution of pH 7-8), and 3 parts of water. 12 parts of a 66% aqueous solution of tristearin-tri-(carbamatomethylpyridinium)trichloride, 4 parts of dibutyl phthalate and 2 parts of chalk are well mixed and added to the above dispersion, followed by 20 parts of a 10% aqueous paste of the pigment obtained by coupling diazotised p-chlor-o-nitroaniline with acetoacet-o-chloranilide. The dispersion so obtained passed through a homogeniser to form a smooth viscous paste.

The so obtained paste is printed on to cotton fabric by means of an engraved roller, and the prints are developed by drying at 105° C. or by baking at 150° C. The resulting prints have an excellent fastness to washing and rubbing and soft handle.

Example 7

12 parts of a 66% cyclohexanol solution of tristearin - tri - (carbamatomethylpyridinium)-trichloride, 2 parts of finely divided chalk and 4 parts of dibutyl phthalate are well mixed, and added to a mixture of 30 parts of an 8% aqueous solution of gum tragacanth, 5 parts of water containing 0.486 part of potassium dihydrogen phosphate and 0.134 part of sodium hydroxide (buffer solution of pH 7-8), 1 part of a 20% aqueous solution of the condensation product of cetyl alcohol with 17 molecular proportions of ethylene oxide, 2 parts of water and 24 parts of a 33% aqueous dispersion of polyvinyl chloride. The composition so obtained is ball milled with 20 parts of a 10% aqueous paste of the pigment obtained by coupling diazotised p-chlor-o-nitroaniline with acetoacet-o-chlor-anilide. The smooth viscous paste so obtained is printed on to cotton fabric by means of engraved rollers, and the prints are developed by drying at 105° C. or by baking at 150° C. The resulting level prints have excellent fastness to dry rubbing, washing and light, and they are of a good handle.

Example 8

13 parts of a rubber latex containing 61% of rubber are mixed with 4 parts of a 25% aqueous solution of the condensation product of cetyl alcohol with 17 molecular proportions of ethylene oxide, and then intimately mixed with 30 parts of an 8% aqueous solution of gum tragacanth, 5 parts of water containing 0.486 part of potassium dihydrogen phosphate and 0.134 part of sodium hydroxide (buffer solution of pH 7-8), and 18 parts of water. 10 parts of an 80% aqueous solution of tristearin-tri-(carbamatomethyltrimethylammonium) trichloride are added to the above dispersion followed by 20 parts of a 10% aqueous dispersion of carbon black, and the mixture is milled until a smooth viscous paste is obtained.

The so obtained paste is printed on to cotton fabric by means of an engraved roller, and the prints are developed by baking at 150° C. The so obtained prints have a good fastness to washing and rubbing and an exceptionally soft handle.

Example 9

26 parts of a 31% aqueous dispersion of polymerised β-ethoxyethyl methacrylate are well mixed with 4 parts of a 25% aqueous solution of the condensation product of cetyl alcohol with 17 molecular proportions of ethylene oxide and added to a mixture of 30 parts of an 8% aqueous solution of gum tragacanth, 5 parts of water containing 0.486 part of potassium dihydrogen phosphate and 0.134 part of sodium hydroxide (buffer solution of pH 7-8), and 2 parts of water. 11 parts of a 72% aqueous solution of tristearin-tri-(carbamatomethylpyridinium) trichloride and 2 parts of chalk are well mixed and added to the above dispersion, followed by the addition of 20 parts of a 10% aqueous paste of the pigment obtained by coupling diazotised p-chlor-o-nitroaniline with acetoacet-o-chloranilide. The dispersion so obtained is passed through a homogeniser until a smooth viscous paste is formed.

The so obtained paste is printed on to cotton fabric by means of an engraved roller, and the prints are developed by drying at 105° C. or by baking at 150° C. The resulting prints have an excellent fastness to washing and rubbing and a soft handle.

Example 10

42 parts of a 19% aqueous dispersion of polymethyl methacrylate (obtained by polymerising methyl methacrylate in aqueous dispersion in presence of hydrogen peroxide and cetyl pyridinium bromide) are well mixed with 34 parts of a 6% aqueous solution of gum tragacanth. 12 parts of a 67% solution of tristearin-tri-(carbamatomethylpyridium) trichloride in cyclohexanol are added to the above dispersion, and the mixture so obtained is added to 10 parts of a 20% aqueous paste of copper phthalocyanine and 2 parts of chalk, and the whole is passed through a homogeniser until a smooth viscous paste is obtained.

The so obtained paste is printed on to cotton fabric by means of an engraved roller, and the prints are developed by drying at 105° C. or by baking at 150° C. The so obtained prints have an excellent fastness to washing and rubbing, and they have a soft handle.

Example 11

12 parts of a 70% solution of tristearin-tri-(carbamatomethyltrimethylammonium) triacetate in ethanol and 8 parts of dimethylolurea-dimethyl ether are dissolved in 25 parts of water, and the solution so obtained is well mixed with a solution of 30 parts of an 8% aqueous solution of gum tragacanth and 5 parts of water containing 0.486 part of potassium hydrogen phosphate and 0.134 part of sodium hydroxide (buffer solution of pH 7-8). 20 parts of a 10% aqueous paste of the pigment obtained by coupling diazotised 2:5-dichloroaniline with 2:3-hydroxy-naphthoic-p-toluidide are milled with the above mixture until a smooth viscous paste is obtained.

The so obtained paste is printed on to cotton fabric by means of an engraved roller, and the prints are developed by baking at 150° C. The resulting prints have a good fastness to washing and rubbing, and they have a soft handle.

Example 12

8 parts of hexamethoxymethyl-melamine and 12 parts of a 70% solution of tristearin-tri-(carbamatomethyltrimethylammonium) trichloride in iso-propanol are dissolved in 35 parts of water, and added to 30 parts of an 8% aqueous solution of gum tragacanth and 5 parts water containing 0.486 part of potassium dihydrogen phosphate and 0.134 part of sodium hydroxide (buffer solution of pH7-8). 10 parts of a 20% aqueous paste of chlorinated copper phthalocyanine are milled with the above mixture until a smooth viscous paste is obtained.

The so obtained paste is printed on to cotton fabric by means of an engraved roller, and the prints are developed by baking at 150° C. The resulting prints have a good fastness to washing and rubbing and a soft handle.

Example 13

8 parts of dimethylolurea dimethyl ether are dissolved in 28 parts of water and added to a mixture of 2 parts of chalk and 12 parts of a 66% solution of tristearin-tri-(carbamatomethylpyridinium) trichloride in cyclohexanol. The resulting dispersion is milled with 50 parts of a 5% aqueous solution of cellulose methyl ethyl ether and 10 parts of a 20% aqueous paste of the pigment obtained by coupling diazotised-p-chloro-o-nitroaniline with acetoacet-o-chloranilide until a smooth viscous paste is obtained.

The resulting paste is printed on to cotton fabric by means of an engraved roller, and the prints are developed by baking at 150° C. The so obtained prints have a good fastness to washing and rubbing and a soft handle.

Example 14

8 parts of dimethylolurea dimethyl ether are dissolved in 25 parts of water and added to a mixture of 2 parts of chalk and 12 parts of a 66% solution of tristearin - tri - (carbamatomethylpyridinium) trichloride in cyclohexanol. 3 parts of titanium dioxide are well mixed with 50 parts of an 8% aqueous solution of polyvinyl alcohol and added to the above dispersion, and the mixture is then homogenised until a smooth viscous paste is obtained.

The so obtained paste is printed on to cotton fabric by means of an engraved roller, and the prints are developed by baking at 150° C. The resulting prints have a good fastness to washing and rubbing and a soft handle.

Example 15

8 parts of dimethylolurea dimethyl ether are dissolved in 23 parts of water and added to 25 parts of an 8% aqueous solution of gum tragacanth. 12 parts of a 66% solution of tristearin-tri - (carbamatomethylpyridinium) trichloride in cyclohexanol, 2 parts of chalk, and 10 parts of dehydrated castor oil-linseed oil modified alkyd resin are well mixed with the above solution, and the dispersion so obtained is mixed with 20 parts of a 10% aqueous paste of the pigment obtained by coupling tetrazotised-3:3'-dichlorobenzidine with 1 - phenyl - 3 - methyl - 5 - pyrazolone and passed through a homogeniser until a smooth viscous paste is obtained.

The so obtained paste is printed on to cotton fabric by means of an engraved roller, and the prints are developed by baking at 150° C. The so obtained prints have a good fastness to washing and rubbing, and they have a soft handle.

The foregoing examples relate to aqueous pastes of a consistency well adapted for application to textile fabrics by printing by means of engraved rollers, and the proportions of pigment used are such that prints with full shades are obtained. If paler shades are required the compositions may be diluted with similar compositions containing no pigment. If desired, of course, more than one of the pigmented compositions may be mixed to provide for the production of different shades. An unpigmented composition suitable for diluting purposes is illustrated in the following example:

*Example 16*

12 parts of a 66% cyclohexanol solution of tristearin - tri - (carbamatomethylpyridinium)-trichloride, 2 parts of finely divided chalk and 4 parts of dibutyl phthalate are well mixed, and added to a mixture of 30 parts of an 8% aqueous solution of gum tragacanth, 5 parts of water containing 0.486 part of potassium dihydrogen phosphate and 0.134 part of sodium hydroxide (buffer solution of pH 7–8), 1 part of a 20% aqueous solution of the condensation product of cetyl alcohol with 17 molecular proportions of ethylene oxide, 2 parts of water and 24 parts of a 33% aqueous dispersion of polyvinyl chloride. The whole is well mixed and then mixed into 160 parts of a 4% aqueous solution of gum tragacanth.

The following examples illustrate aqueous pastes which are of a consistency well adapted for the production of all-over colouration effects on textile fabrics, and also the application of such pastes:

*Example 17*

80 parts of the pigmented aqueous paste described in Example 7 are mixed with 120 parts of a 1% aqueous gum tragacanth solution.

The so obtained paste is padded on to cotton fabric, and the fabric is then subjected to a baking operation at 150° C. for several minutes. The fabric thus obtained has an even and deep, bright yellow colour which has an excellent fastness to light, a good fastness to aqueous washing, to dry cleaning solvents and to rubbing; the handle of the fabric is good.

*Example 18*

10 parts of the pigmented aqueous paste described in Example 7 are well mixed with 190 parts of the unpigmented paste made as described in Example 16, except that the 160 parts of 4% aqueous gum tragacanth solution are replaced by 160 parts of a 1% gum tragacanth solution.

The resulting paste is padded on to cotton fabric, and the fabric is then subjected to baking at 150° C. for several minutes. There is thus obtained an evenly coloured fabric similar to that described in Example 17, except that its colour is paler.

*Example 19*

80 parts of the pigmented paste described in Example 7 are well mixed with 120 parts of a 4% aqueous gum tragacanth solution.

The resulting paste is applied to a cotton fabric by back-filling, and the fabric is then subjected to a baking operation at 150° C. for several minutes. There is thus obtained a fabric essentially the same in appearance and handle as that of Example 17.

We claim:

1. An aqueous paste as claimed in claim 6 wherein said binder is solid, finely divided, plasticized polyvinyl chloride.

2. An aqueous paste as claimed in claim 6 which contains a water-soluble thickening agent.

3. An aqueous paste as claimed in claim 2 wherein said water soluble thickening agent is gum tragacanth.

4. An aqueous paste as claimed in claim 6 containing a mild alkali.

5. An aqueous paste as claimed in claim 6 wherein said quaternary ammonium compound is tristearin-tris-(carbamatomethylpyridinium) trichloride.

6. An aqueous paste for the coloration of textile materials comprising a pigment, a binder therefor selected from the group consisting of water-insoluble resinous binders and water-soluble thermo-setting binders, and a quaternary ammonium compound of the formula

wherein R represents a radical selected from the group consisting of alkylene radicals, higher fatty acid esters of polyalkylols, and higher fatty acid amides of alkylene amines, A represents the radical of a pentavalent nitrogen compound derived from an amine selected from the group consisting of aliphatic tertiary amines and heterocyclic tertiary amines, X represents the anion of an acid and $n$ represents a whole number greater than one, the amount of quaternary compound employed being at least twice the weight of said pigment.

7. An aqueous paste as claimed in claim 6 wherein said quaternary ammonium compound is tristearin - tris - (carbamatomethyltrimethylammonium)-trichloride.

8. An aqueous paste as claimed in claim 6 wherein said quaternary ammonium compound is tristearin-tris-(carbamatomethyltrimethylammonium) triacetate.

9. An aqueous paste as claimed in claim 6 wherein said quaternary ammonium compound is trimethylene-1:3-bis-(carbamatomethylpyridinium)-dichloride.

10. An aqueous paste as claimed in claim 6 wherein said quaternary ammonium compound is triolein - tris - (carbamatomethylpyridinium)-trichloride.

GEORGE TRAPP DOUGLAS.
ARTHUR LOWE.
SYDNEY ROBINSON.

REFERENCES CITED

The following references are of record in the file of this patent:

UNITED STATES PATENTS

| Number | Name | Date |
|---|---|---|
| 2,191,362 | Widmer et al. | Feb. 20, 1940 |
| 2,202,200 | Haller et al. | May 28, 1940 |
| 2,361,270 | Collins et al. | Oct. 24, 1944 |